United States Patent
Peeters

(10) Patent No.: US 6,415,648 B1
(45) Date of Patent: Jul. 9, 2002

(54) METHOD FOR MEASURING RESERVOIR PERMEABILITY USING SLOW COMPRESSIONAL WAVES

(75) Inventor: Maximiliaan Peeters, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 09/252,419

(22) Filed: Feb. 18, 1999

(51) Int. Cl.⁷ .......................... G01V 1/40; G01V 1/00; G01V 1/28
(52) U.S. Cl. .................. 73/38; 73/152.05; 73/152.16; 73/152.47; 166/250.02; 367/25; 367/31
(58) Field of Search ................................. 73/38, 152.05, 73/152.16, 152.47, 152.58, 597; 166/250.02; 367/25, 31, 911; 340/856.4

(56) References Cited

U.S. PATENT DOCUMENTS

| | | | | | |
|---|---|---|---|---|---|
| 3,330,375 A | * | 7/1967 | White, Jr. | ...................... | 181/0.5 |
| 3,622,969 A | | 11/1971 | Lebreton et al. | ........... | 340/15.5 |
| 3,721,960 A | * | 3/1973 | Tinch et al. | ................... | 73/152 |
| 3,900,826 A | | 8/1975 | Dowling et al. | ........... | 340/15.5 |
| 4,008,608 A | * | 2/1977 | Reynolds | ...................... | 73/154 |
| 4,131,875 A | * | 12/1978 | Ingram | ................ | 340/15.5 BH |
| 4,432,077 A | | 2/1984 | Alhilali et al. | ................. | 367/31 |
| 4,524,432 A | * | 6/1985 | Johnson | ........................ | 367/25 |
| 4,552,011 A | * | 11/1985 | Wiley | ............................ | 73/4 R |
| 4,575,828 A | * | 3/1986 | Williams | ....................... | 367/31 |
| 4,636,994 A | * | 1/1987 | Fertl et al. | ...................... | 367/75 |
| 4,764,903 A | * | 8/1988 | Siebert | .......................... | 367/29 |
| 4,813,028 A | | 3/1989 | Liu | .............................. | 367/31 |
| 4,831,530 A | * | 5/1989 | Rai | ............................. | 364/421 |
| 4,858,198 A | | 8/1989 | Weissman | ..................... | 367/31 |
| 4,888,740 A | | 12/1989 | Brie et al. | ...................... | 367/30 |
| 4,964,101 A | * | 10/1990 | Liu et al. | ....................... | 367/31 |
| 5,005,666 A | * | 4/1991 | Fairborn | ...................... | 181/102 |
| 5,331,604 A | | 7/1994 | Chang et al. | .................. | 367/31 |
| 5,687,138 A | | 11/1997 | Kimball et al. | ................ | 367/31 |
| 5,784,333 A | * | 7/1998 | Tang et al. | .................... | 367/30 |

* cited by examiner

Primary Examiner—Hezron Williams
Assistant Examiner—David J. Wiggins
(74) Attorney, Agent, or Firm—Holme Roberts & Owen LLP; Christopher J. Kulish, Esq.

(57) ABSTRACT

The present invention provides a method that is useful in determining the permeability of rock within a subterranean formation surrounding a borehole. The method involves the establishment of a compressional wave in the borehole rock of interest and the subsequent detection of a slow compressional wave that is directly related to the permeability of the rock. The slow compressional wave typically has a velocity of approximately 900 m/s. In contrast, the compressional waves used to make borehole measurements in the past have, velocities of approximately 2000–3000 m/s.

12 Claims, 3 Drawing Sheets

METHOD FOR MEASURING RESERVOIR PERMEABILITY USING SLOW COMPRESSIONAL WAVES

FIELD OF THE INVENTION

The present invention relates to a method for use in determining the permeability of rocks in a subterranean formation surrounding a borehole.

BACKGROUND OF THE INVENTION

Permeability is a measure of the hydraulic conductivity of a rock, i.e., the ease or difficulty with which a fluid (oil, gas or water) flows through porous rock. In oil/gas fields, the permeability of the rock associated with an oil/gas reservoir is an important parameter to measure, because it is directly related to the rate of oil or gas that can be produced. To elaborate, in exploiting an oil/gas reservoir, one or more wells or boreholes are drilled at locations that typically have been determined based upon information obtained from seismic surveys, exploratory wells and the like. Once the wells have been drilled, the permeability of the rock formations encountered in the borehole is an important parameter in managing the well or wells so as to maximize the oil/gas that can be extracted from the reservoir.

There are a number of methods presently in use for determining the permeability of the rock in a borehole. One method, known as formation testing, involves using a wireline to lower an instrument to a desired location within the borehole. The instrument is adapted to force a nozzle into contact with the rock. The nozzle is then used to draw fluids from the rock. The ease or difficulty associated with drawing the fluids is indicative of the permeability of the rock. Formation testing, while providing a direct measurement of permeability, is subject to errors attributable to borehole fluid invasion effects and drilling induced formation damage.

Production testing is another method of directly measuring permeability. In production testing, a zone of a borehole is hydraulically isolated with packers and the fluid production of the well is guided to the surface through a sting of pipes. The volume of fluids produced and the thickness of the zone are used to derive the permeability of the rock in the isolated zone. Production testing, while typically providing reliable data, is very expensive due to the substantial amount of equipment required and the length of the test period, typically several days.

Yet another method involves the use of Stoneley acoustic waves to measure parameters that are related, but not equivalent to permeability. These measurements are then used to infer the permeability or range of permeabilities. Stoneley acoustic waves are waves that travel along the interface between the rock that defines the borehole and the fluid in the borehole. This method also uses a wireline to lower instrumentation into the borehole that causes Stoneley waves to be formed. The same tool detects the Stoneley waves after they have interacted with the rock of interest. Unlike formation testing, the instrumentation is not placed in direct contact with the rock. Consequently, the instrumentation is typically designed so that measurements are taken while the instrumentation is being raised or lowered by the wireline. One of the major shortcomings associated with the Stoneley waves approach is that the relationship of the measurements made with Stoneley waves to permeability can vary substantially from reservoir to reservoir. To address this variability, it is necessary to perform calibration procedures that make use of permeability measurements made on cores taken from the borehole or measurements made during formation testing.

Another method that provides an indirect measure of permeability utilizes nuclear magnetic resonance. To elaborate, nuclear magnetic resonance is used to measure the decay times of protons that are indicative of the pore size distribution, which in turn can be used to infer the permeability of the rock of interest. This method of measuring permeability is typically implemented using a moving wireline logging instrument. The limitations associated with nuclear magnetic resonance are substantially the same as those noted with respect to the Stoneley or tube wave approach.

SUMMARY OF THE INVENTION

The present invention is directed to a method of measuring the permeability of rock within a borehole that makes use of a slow compressional wave, which propagates through the rock of interest. To elaborate, an acoustic or wave that travels through a porous rock can manifest itself in three modes: (1) a fast compressional wave, which is also known as a p-wave, in which the solid rock material and the fluid in the pores move in phase with one another; (2) a slow compressional wave in which the solid rock material and fluid in the pores move out of phase with one another; and (3) a transverse wave, which is also known as a shear wave or s-wave, in which the particles move perpendicular to the wave propagation direction. The compressional wave presently known to be used in making borehole measurements is the fast compressional wave with a velocity of approximately 2000–3000 m/s. The present invention makes use of the slow compressional wave, which typically has a velocity of approximately 900 m/s.

The method involves transmitting a compressional wave into the rock of interest at a fixed location within the borehole. The compressional wave manifests itself both as fast compressional wave and a slow compressional wave. The slow compressional wave is subsequently detected at a second location that is a known distance from the first location. Information associated with the transmitting and detecting steps is subsequently used to determine the velocity of the slow compressional wave. Namely, the elapsed time between the transmission of the compressional wave and detection of the slow compressional wave and the known distance between the first and second locations provides sufficient information to determine the velocity of the slow compressional wave. The velocity of the slow compressional wave is, in turn, combined with other information to calculate the permeability of the rock of interest.

Among the other information that, in conjunction with the velocity of the slow compressional wave, is used to determine the rock permeability is the velocity of the fast compressional wave. In some instances, the velocity of the fast compressional wave may be available from prior measurements. However, since the transmission of the compressional wave used to produce the slow compressional wave also produces a fast compressional wave, one embodiment of the invention also detects the fast compressional wave. The velocity of the fast compressional wave is determined from the elapsed time between the transmission of the compressional wave and the detection of the fast compressional wave and the known distance between the location from which the compressional wave was transmitted and the location at which the fast compressional wave is detected.

In one embodiment, the locations associated with the transmission of the compressional wave and detection of the slow compressional wave are chosen to be between about 10 cm and 50 cm of one another because of the high degree of attenuation that is likely to be experienced by the slow compressional wave as it propagates through the rock of interest. Further separation of the two locations is feasible. However, more sensitive detectors are required and/or signal processing to separate the slow compressional wave signal from noise.

In one embodiment, the location from which the compressional wave is transmitted (first location) and the location at which the slow compressional wave is detected (second location) are chosen so that a permeability measurement is made in a preferred direction or dimension. In one situation, the first and second locations define a line that is substantially parallel to the longitudinal axis of the borehole. In a vertical borehole, this orientation of the first and second locations results in information being obtained that is useful in determining the vertical permeability of the rock of interest. In another embodiment, the first and second locations define a line that is substantially perpendicular to the longitudinal axis of the borehole. This orientation, in a vertical borehole, provides data that is useful in calculating the horizontal permeability of the rock of interest. In yet another embodiment, the slow compressional wave is detected at two locations that, together with the first location, define a right angle. In this instance, the orthogonal permeabilities of the rock of interest are determinable. In the case of a vertical borehole, this means that both vertical and horizontal permeabilities are determinable.

DETAILED DESCRIPTION

Figure 1:
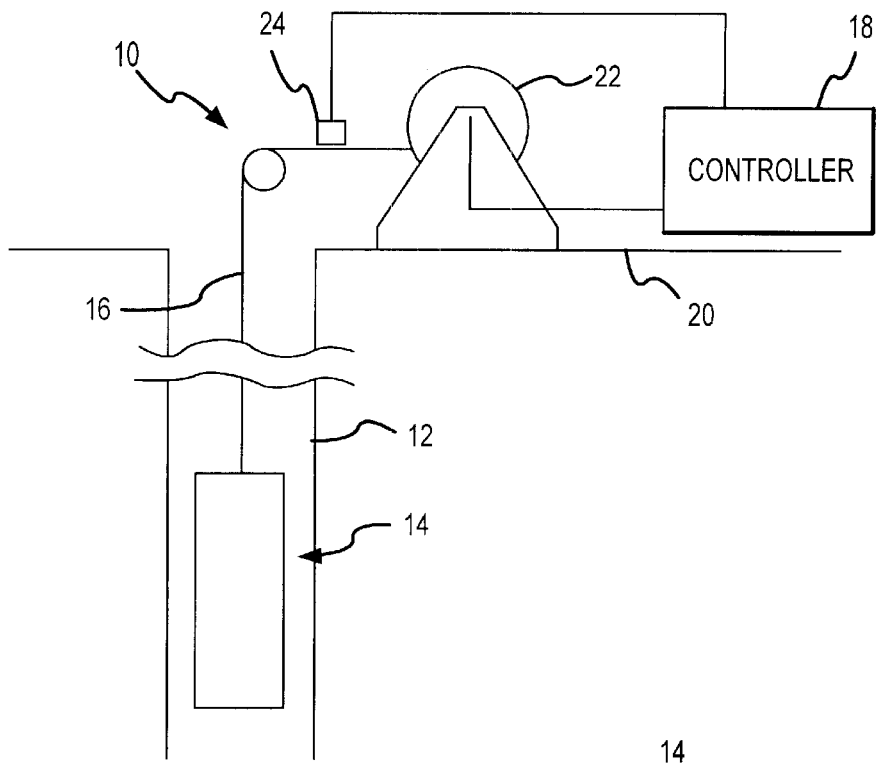
FIG. 1 is a schematic and block diagram of a wireline logging system capable of being used to obtain information useful in determining the permeability of rock within a borehole.

FIG. 1 illustrates a wireline logging system 10 that is capable of obtaining slow compressional wave related information and, if desired, using this information to determine the permeability of rock located in a borehole 12. The system 10 includes a tool 14 that embodies the components that are used to produce a compressional wave in the rock of interest and detect the slow compressional wave that has propagated through the rock of interest and if needed, the fast compressional wave. The system 10 further comprises an electric cable 16 that is used to transmit electrical signals between the tool 14 and a controller 18 located on the surface 20. The electric cable 16 is also used in conjunction with a winch system 22 to raise and lower the tool 14 within the borehole 12 at the direction of the controller 18. A transducer 24 permits the controller 18 to monitor the position of the tool 14 within the borehole 12.

Figure 2:
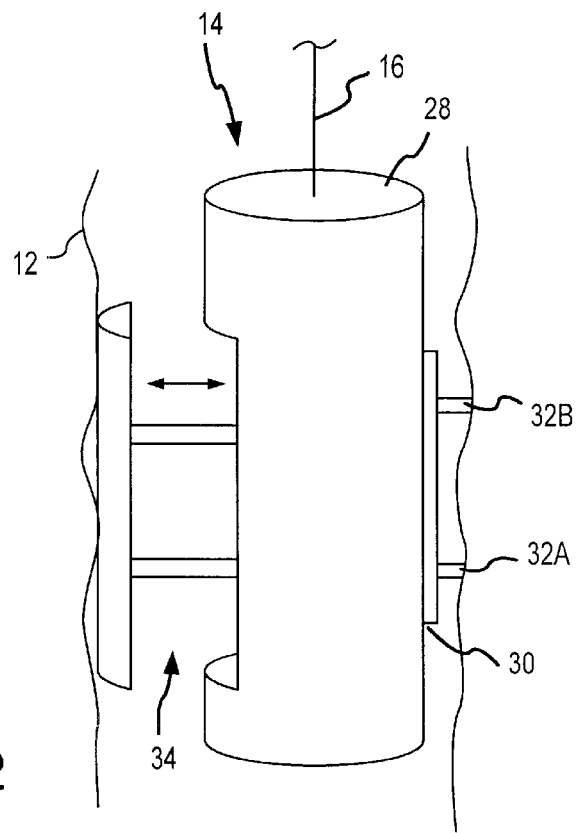
FIG. 2 illustrates the tool portion of the wireline tool system shown in FIG. 1 fixed in place in a borehole.
Figure 3:
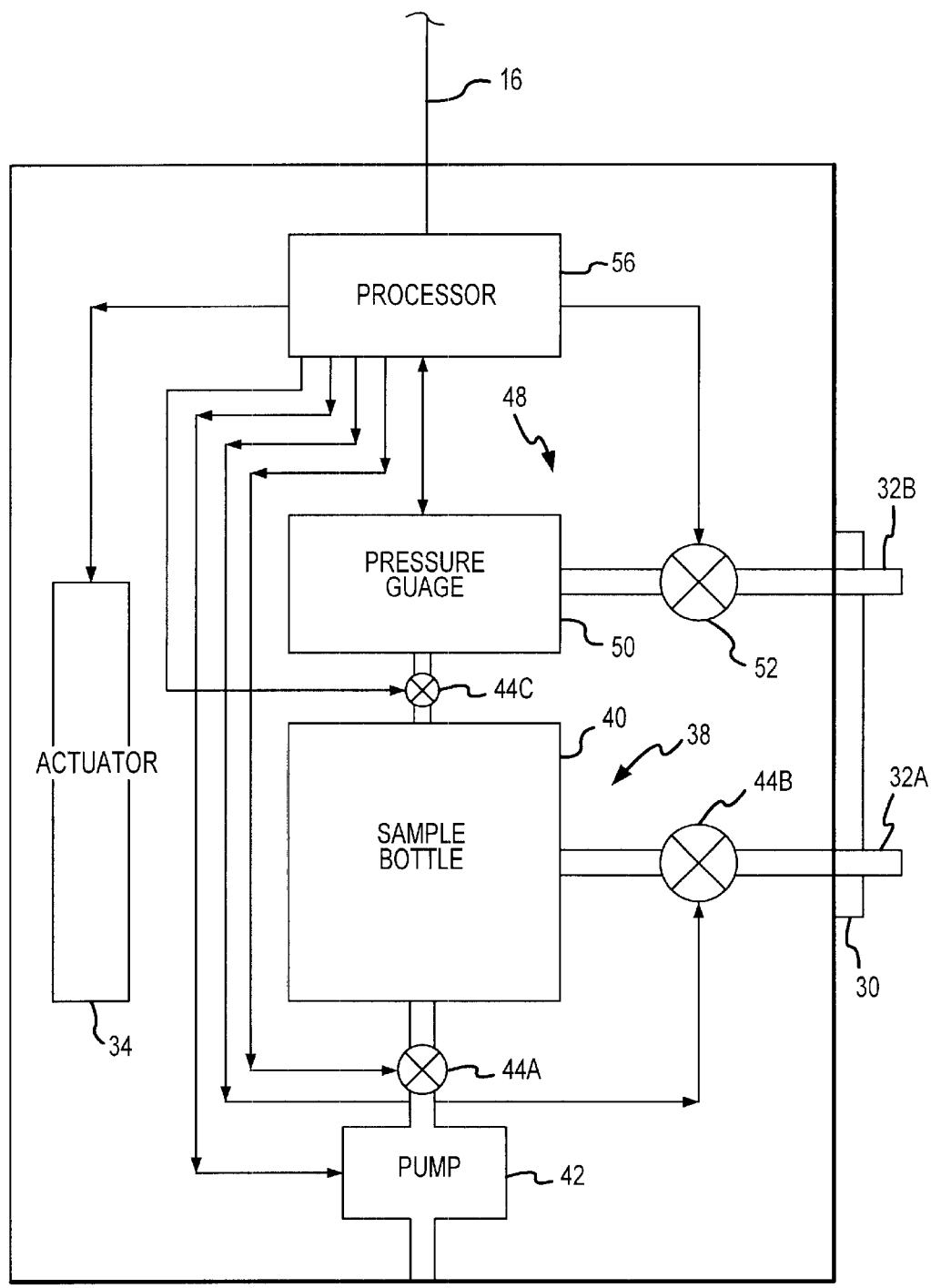
FIG. 3 is a block diagram of the components of the tool portion of the wireline tool system shown in FIG. 1 that are used in creating a compressional wave in the rock of interest and detecting the slow compressional wave and if needed, the fast compressional wave.

With reference to FIGS. 2 and 3, the tool 14 includes a tool housing 28 within which most of the other components of the tool 14 are hermetically sealed to protect them from the fluid within the borehole 12. Located on one side of the tool housing 28 is pad 30 through which a pair of nozzles 32A, 32B extend. The pad 30 provides a frictional surface that facilitates fixing the tool 14 at a desired location within the borehole 12. The first nozzle 32A is used in to create a pressure step that induces a compressional wave into the rock of interest. The second nozzle 32B is used in sensing both slow and fast compressional waves that have resulted from the pressure step output by the first nozzle 32A after these waves have propagated through the rock of interest. The nozzles 32A, 32B are oriented such that a line extending between the nozzles is substantially parallel to the longitudinal axis of the borehole when the tool is in use. This orientation of the nozzles 32A, 32B, in a vertical borehole, provides information that is used to determine the vertical permeability of the rock of interest.

An actuator mechanism 34 is used to fix the tool 14 at a desired location in the borehole 12 and place the nozzles 32A, 32B into fluid pressure contact with the porous rock of interest. The actuator mechanism 34, when activated, creates a normal force between the wall of the borehole 12 and the tool 14 that holds the tool 14 in place so that the necessary permeability related information can be obtained. In the illustrated embodiment, the actuator mechanism 34 mechanically brings the pad 30 into contact with the wall of the borehole and thereby nozzles 32A, 32B into fluid pressure contact with the porous rock. There are, however, many other kinds of actuator mechanisms that allow a tool to be selectively fixed in place in a borehole. For instance, large springs and bladder mechanisms have also been used.

The tool 14 includes a pressure step generating system for inducing a compressional wave in the rock of interest. With reference to FIG. 3, a pressure step generating mechanism 38 is provided that includes a sample bottle 40 which is used in establishing a pressure sink in the rock of interest. Also part of the mechanism 38 is a pump 42 that is used to establish a low pressure in the sample bottle 40. First and second sample bottle valves 44A, 44B are used to: (1) establish a low pressure in the sample bottle 40; and (2) create a pressure step that is transmitted by the first nozzle 32A into the rock of interest. To elaborate, the establishment of a low pressure in the sample bottle 40 is accomplished by: (1) opening the first sample bottle valve 44A to establish a fluid communication between the sample bottle 40 and the pump 42; and (2) closing the second sample bottle valve 44B to disconnect the sample bottle 40 from the first nozzle 32A. With the first and second sample bottle valves 44A, 44B in these states, the pump 42 is activated to evacuate fluid from the sample bottle 40 and establish a low pressure in the sample bottle 40. In one embodiment, the low pressure in the sample bottle 40 is in the range of approximately 10–50 bar below the pressure in the borehole 12. Typically, the pump 42 provides an indication of when the desired low pressure is achieved within the sample bottle 40. However, it is also feasible to use a pressure gauge that is part of the tool to determine when the desired low pressure is attained. Once the desired low pressure has been established in the sample bottle 40, the first sample bottle valve 44A is closed. With the first and bottle valve 44A now closed, a pressure step is established in the rock of interest by opening the second sample bottle valve 44B which, in turn, induces a compressional wave in the rock of interest.

The tool 14 also includes a slow compressional wave detector. In the illustrated embodiment, a slow compressional wave detector 48 is provided that is also capable of detecting a fast compressional wave. As a consequence, the slow compressional wave detector 48 is hereinafter referred to as the compressional wave detector 48. Included in the compressional wave detector 48 is a pressure gauge 50. Suitable pressure gauges are quartz pressure gauges, which are capable of detecting pressure to an accuracy of 0.01 psi. A compressional wave detector valve 52 is used to connect/ disconnect the pressure gauge 50 to/from the second nozzle 32B. To elaborate, when the pressure gauge is not being used, the valve 52 is used to disconnect the pressure gauge 50 from the second nozzle 32B and thereby protect the gauge from being subjected to pressures within the borehole 12 that could bias or damage the gauge 50. The valve 52 is opened when the pressure gauge 50 is needed to detect the slow and, if needed, the fast compressional waves that have propagated through the rock of interest. Since the slow compressional wave is highly attenuated by the rock of interest, the second nozzle 32B is located relatively close to the first nozzle 32A to insure that a detectable slow compressional wave is received at the second nozzle 32B. Due to the limitations of presently available instrumentation, the second nozzle 32A is located no more than about 50 cm away from the first nozzle 32A and, preferably, in the range of 10–50 cm away from the first nozzle 32A.

The tool 14 also includes a processor for managing communications between the controller 18 and the various elements within the tool 14. The processor can take any number of forms. At one end of the spectrum, the processor is simply an interface that relays commands and data between the tool 14 and the controller 18. At the other end of the spectrum, the processor is capable of performing an entire test and recording the data once the controller 18 has informed the processor that the tool 14 is at a desired location within the borehole 14. In the illustrated embodiment, a processor 56 is provided that is capable of performing an entire test once informed that the tool 14 is at an appropriate location in the borehole 14 by the controller 18. However, the processor 56 relays the data to the controller 18 for further relay, recordation and/or processing to determine the permeability of the rock of interest. The processor 56 controls: (1) the actuator 34 to fix the tool 14 in a desired location in the borehole 12; (2) the pump 42 and the first and second sample bottle valves 44A, 44B to establish a low pressure within the sample bottle 40; (3) the first and second sample bottle valves 44A, 44B to generate a pressure step that is applied, via the first nozzle 32A, to the rock of interest; (4) the pressure gauge 50 and the detector valve 52 to detect slow and/or fast compressional wave data received via the second nozzle 32B; and (5) the detector valve 52 to protect the pressure gauge 50 when not in use. The processor 56 also relays pressure data produced by the pressure gauge 50 during a test to the controller 18. The controller 18 can, in turn, relay the data to another location, record the data for later processing at the site of the controller or a remote site, and/or process the data to determine the permeability of the rock of interest.

Having now described a system capable of: (1) applying a pressure step to the rock of interest in a borehole that induces a compressional wave in the rock; and (2) detecting a resulting slow compressional wave that has propagated through the rock of interest, the method of the invention is now described in the context of the wireline tool system 10. It should, however, be appreciated that the method of the invention is not limited to the system 10. For instance, there are a number of ways in which a compressional wave can be established in the rock of interest. For instance, a high pressure step, rather than a low pressure step, can be used to create the compressional wave. The low pressure step, however, serves to preserve the seal of the pad 30 against the borehole wall. Another way to establish a compressional wave in the rock of interest is to use of an impact or hammer device. Furthermore, there are potentially several ways to detect the slow compressional wave, including piezoelectric transducers and strain gauges. In summary, the method of the present invention is applicable regardless of the manner in which a compressional wave is established in the rock of interest and the slow compressional wave detected.

Initially, the tool 14 is lowered to a desired location in the borehole 12. To lower the tool 14 to a desired location, the controller 18 monitors the amount of electric cable 16 that is dispensed by the winch system 22 and controls the winch system 22 accordingly.

Once the tool 14 is at the desired location in the borehole 12, the tool 14 is used to cause a compressional wave to propagate through the rock of interest. At the outset, this involves fixing the tool 14 in place within the borehole and establishing fluid pressure contact between the first and second nozzles 32A, 32B and the wall of the borehole 12 by activating the actuator mechanism 34. If the sample bottle 40 is known to have the required low pressure, the second sample bottle valve 44B is opened to create a pressure step that induces a compressional wave in the rock of interest. However, if it is known that the sample bottle 40 does not have the necessary low pressure or there is uncertainty as to the state of the sample bottle 40, the processor 56 operates to establish the needed low pressure in the sample bottle 40. As previously noted, this involves closing the second sample bottle valve 44B, opening the first sample bottle valve 44A and activating the pump 42. The desired low pressure is detected by opening a third sample bottle valve 44C (with valve 44B closed) to establish a hydraulic connection between the sample bottle 40 and the pressure gauge 50. Once the required low pressure is established, the processor 56 causes the first sample bottle valve 44A and third sample bottle valve 44C to close. At this point, the pressure step is generated in the rock of interest by opening the second sample bottle valve 44B.

Figure 4:
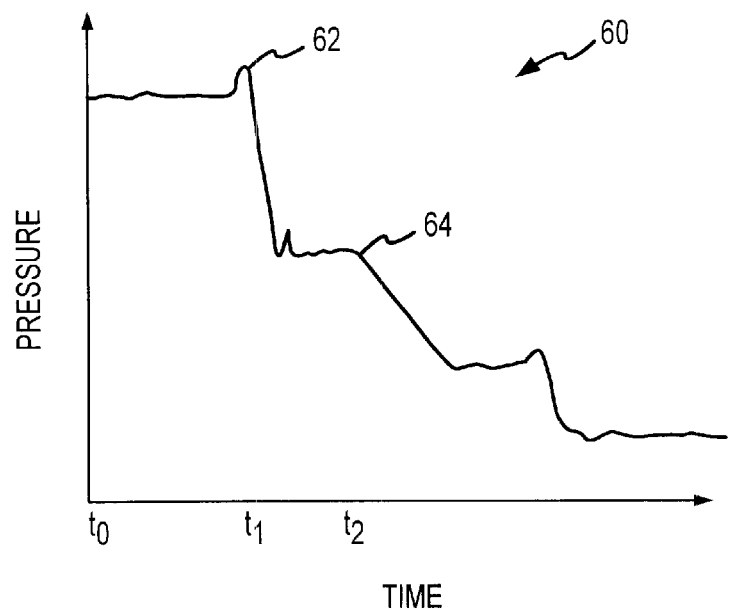
FIG. 4 is a graph of the signal produced by the pressure gauge portion of the tool with the portions of the signal that correspond to the fast and slow compressional waves identified.

After the tool is at the desired location in the borehole 12, the tool 14 is used to detect a slow compressional wave that has propagated through the rock of interest in response to a pressure step applied to the rock. To detect the slow compressional wave, the detector 48 is also placed in an active state by opening the compressional wave detector valve 52 to establish a fluid communication path between the pressure gauge 50 and the second nozzle 32B. Typically, the valve 52 is opened after the actuator 34 has established fluid pressure contact between the second nozzle 32B and the wall of the borehole 12 to avoid unnecessarily exposing the gauge 50 to the fluid pressure in the borehole 12. In any event, the detector 48 must be activated in time to receive the slow compressional wave produced after the pressure step is applied to the rock of interest by the compressional wave generating mechanism 38. If the velocity of the fast compressional wave is not already known, the detector 48 is also used to detect information relating to the fast compressional wave. In this case, the detector 48 must be enabled in time to detect the fast compressional wave. FIG. 4 illustrates a pressure signal 60 produced by the gauge 50 when enabled in time to detect both the fast and slow compressional waves. The pressure signal 60 includes a first steep drop 62 that is representative of the fast compressional wave and a second, less steep drop 64 that is representative of the slow compressional wave.

After the slow compressional wave and, possibly, the fast compressional wave have been detected, the data is processed to determine the permeability of the rock of interest. As previously noted, the data can be processed either on site by the controller 18 or at a remote location. In any event, the velocity of the slow compressional wave is determined by dividing the known distance between the first and second nozzles 32A, 32B by the elapsed time between the application of the pressure step to the rock that induces the compressional wave and the detection of the onset of the slow compressional wave. If the velocity of the fast compressional wave if not already known, it is determined in the same manner. Once the velocities of the slow and fast compressional waves are known, the following equation is solved to determine the steady state permeability $k_0$:

$$\varsigma_{p2}^2 = -\frac{i\eta\phi}{f(\omega)K_o}\frac{\varsigma_{p1}^2\rho_B}{K_f(K_b+4G/3)} \quad (1)$$

where $\varsigma_{p1}$ is the velocity of the fast compressional wave;
$\varsigma_{p2}$ is the velocity of the slow compressional wave;
$\eta$ is fluid viscosity;
$\phi$ is porosity;
$\rho_B$ is bulk density;
$K_f$ is fluid bulk modulus;
$K_b$ is the bulk modulus of the porous rock;
$G$ is the shear modulus; and
$f(\omega)$ is a complex function that is dependent on the frequency content of the pressure step.

The values for the parameters $\eta$ and $K_f$ can be estimated from fluid samples; the value of the parameter $\rho_B$ can be estimated from a density log; and the values of the parameters $K_b$ and $G$ can be estimated from a dipole sonic log and density log combination. If the rock formation of interest is unconsolidated and the fluid in the reservoir is highly compressible (e.g., gas), equation 1 can be simplified to:

$$\varsigma_{p2}^2 = -\frac{i\eta\phi}{f(\omega)k_o K_f} \quad (2)$$

Figure 5:
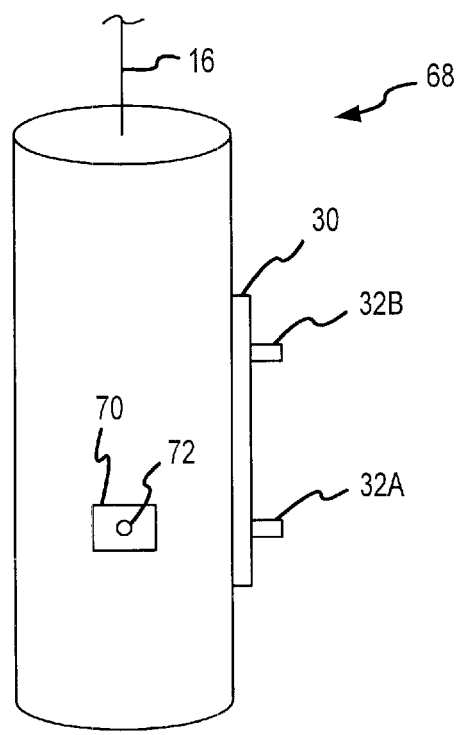
FIG. 5 is an alternative embodiment of the tool that includes a second detector that is useful in determining an orthogonal permeability relative to the first detector.

In many instances, it is desirable to determine the permeability of the rock of interest in more than one direction. For instance, it may be desirable to determine the vertical and horizontal permeability of the rock of interest in a borehole. The detection of information relating to the slow compressional wave and, if needed, the fast compressional wave in these other directions is achieved by the addition to the tool of appropriately positioned nozzles and compressional wave detectors that perform comparably to the previously discussed second nozzle 32A, pressure gauge 50 and valve 52. With reference to FIG. 5, a tool 68 is illustrated that includes the first and second nozzles 32A, 32B and related internal componentry noted with respect to tool 14. The tool 68 further includes a pad 70 and a third nozzle 72. Associated with the third nozzle 72 is a pressure gauge and valve assembly that function in substantially the same fashion as the pressure gauge 50 and valve 52. The third nozzle 72 is positioned such that a first line extending between the third nozzle 72 and the first nozzle 32A is substantially perpendicular to a second line extending between the second nozzle 32B and the first nozzle 32A. With this arrangement of nozzles, information relating to the permeability in orthogonal directions is obtainable. In the case of a vertical borehole, the information obtained would relate to both the vertical the horizontal permeability. The resulting vertical and horizontal permeability measurements are combinable into a vertical to horizontal permeability ratio that is also of considerable importance in the management of an oil/gas reservoir.

A number of variations in the instrumentation used to obtain information relating to the slow compressional wave are feasible. As previously noted there are a number of alternative ways to generate a compressional wave, detect the slow compressional wave and fix a tool at a desired location in a borehole. The invention also contemplates that other ways to perform these functions will be developed in the future. The method of is not, however, constrained to any particular apparatus for accomplishing these functions. It should be noted, however, that it is feasible to integrate the componentry for generating a compressional wave and detecting a slow compressional wave into a drilling string so that permeability related information could be obtained while the well is being drilled rather than with a separate wireline tool system after the well has been drilled.

The foregoing description of the invention has been presented for purposes of illustration and description. Further, the description is not intended to limit the invention to the form disclosed herein. Consequently variations and modification commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A method for use in determining the permeability of rock within a subterranean formation surrounding a borehole, the method comprising the following steps:

causing a compressional wave to propagate through the rock of interest in a borehole, said compressional wave propagating from a first depth location within the borehole;

said compressional wave propagating through the rock comprising a slow compressional wave and a fast compressional wave;

detecting information relating to the velocity of said slow compressional wave at a second location within the borehole that is different than said first location;

said step of causing includes creating a pressure step at the first depth location to induce said compressional wave in the rock of interest;

determining, using the velocity of said slow compressional wave, the permeability of the rock of interest according to:

$$\zeta_{p2}^2 = -\frac{i\eta\phi}{f(\omega)K_o}\frac{\zeta_{p1}^2\rho_B}{K_f(K_b+4G/3)}$$

2. A method, as claimed in claim 1, further comprising:
    determining, using said information, the velocity of said slow compressional wave.

3. A method, as claimed in claim 1, wherein:
    said first location and said second location are separated by less than about 50 cm.

4. A method, as claimed in claim 1, further comprising:
detecting information relating to the velocity of said fast compressional wave at a third location.

5. A method, as claimed in claim 1, wherein:
said step of causing includes placing a wireline tool in said borehole that has means for causing said compressional wave, means for detecting said slow compressional wave, and means for fixing said wireline tool at a particular location within said borehole.

6. A method for use in determining the permeability of rock within a subterranean formation surrounding a borehole, the method comprising the following steps:
causing a compressional wave to propagate through the rock of interest within a borehole, said compressional wave propagating from a first location in the borehole;
said compressional wave propagating through the rock comprising a slow compressional wave and a fast compressional wave;
detecting information relating to the velocity of said slow compressional wave at a second location within the borehole that is different than said first location; and
detecting information relating to the velocity of said fast compressional wave at a third location within the borehole that is different than said first location;
wherein said first, second and third locations are substantially colinear;
wherein said first, second and third locations are substantially perpendicular to the longitudinal axis of the borehole.

7. A method, as claimed in claim 6, wherein:
said third location is the same as said second location.

8. A method for use in determining the permeability of rock within a subterranean formation surrounding a borehole, the method comprising the following steps:
causing a compressional wave to propagate through the rock of interest within a borehole, said compressional wave propagating from at a first location in the borehole;
said compressional wave propagating through the rock comprising a slow compressional wave and a fast compressional wave;
detecting information relating to the velocity of said slow compressional wave at a second location within the borehole; and
detecting information relating to the velocity of said slow compressional wave at a third location within the borehole that is different than said second location;
a line extending between said first and second locations is substantially perpendicular to a line extending between said first and third locations.

9. A method, as claimed in claim 8, further comprising:
detecting information relating to the velocity of said fast compressional wave at a fourth location and a fifth location that is different that said fourth location.

10. A method for use in determining the permeability of rock within a subterranean formation surrounding a borehole, the method comprising the following steps:
causing a compressional wave to propagate through the rock of interest within a borehole, said compressional wave propagating from at a first location in the borehole;
said compressional wave propagating through the rock comprising a slow compressional wave and a fast compressional wave;
detecting information relating to the velocity of said slow compressional wave at a second location within the borehole; and
detecting information relating to the velocity of said slow compressional wave at a third location within the borehole that is different than said second location;
detecting information relating to the velocity of said fast compressional wave at a fourth location and at a fifth location that is different than said fourth location; and
a line extending between said first, second and fourth locations is substantially perpendicular to a line extending between said first, third and fifth locations.

11. A method, as claimed in claim 10, wherein:
said fourth location is the same as said second location and said fifth location is the same as said third location.

12. A method for use in determining the permeability of rock within a subterranean formation surrounding a borehole, the method comprising the following steps:
providing a wireline tool that includes means for creating a compressional wave at a first location in the rock of interest within a borehole and means for detecting a slow compressional wave at a second location within the borehole;
positioning said wireline tool in a borehole at a location within the borehole that is adjacent to the rock of interest;
using said wireline tool to cause a compressional wave to propagate through the rock of interest at a first time $t_1$; and
detecting information relating to the velocity of a slow compressional wave at said second location at time $t_2$;
determining, using the velocity of said slow compressional wave, the permeability of the rock of interest according to:

$$\zeta_{p2}^2 = -\frac{i\eta\phi}{f(\omega)K_o}\frac{\zeta_{pl}^2 \rho_B}{K_f(K_b + 4G/3)}$$

* * * * *